(12) United States Patent
Ogawara et al.

(10) Patent No.: US 6,353,274 B1
(45) Date of Patent: Mar. 5, 2002

(54) MOUNTING STRUCTURE OF ROTARY SHAFT OF ROTARY ELECTRIC MACHINERY

(75) Inventors: Toshiki Ogawara; Toshio Shinohara; Michihiro Suzuki, all of Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 09/577,278

(22) Filed: May 23, 2000

(30) Foreign Application Priority Data

Jun. 30, 1999 (JP) .......................................... 11-186365

(51) Int. Cl.⁷ ............................. H02K 5/00; F04B 17/03
(52) U.S. Cl. ...................... 310/91; 417/423.7; 417/203
(58) Field of Search ........................... 310/261, 42, 90, 310/91, 67 R; 29/225, 229, 892; 474/161; 417/423.7, 371, 410

(56) References Cited

U.S. PATENT DOCUMENTS 4,626,722 A * 12/1986 Fukui ............................ 310/82
5,069,654 A * 12/1991 Rampe ......................... 474/161
5,879,141 A    3/1999 Yokozawa et al. ........ 417/423.7

* cited by examiner

Primary Examiner—Tran Nguyen
(74) Attorney, Agent, or Firm—Rankin, Hill, Porter & Clark LLP

(57) ABSTRACT

The present invention provides a mounting structure of a rotary shaft of rotary electric machinery in which it is possible to cope with vibration of the rotary shaft in an axial direction with a low parts count. A fitting groove into which a portion of a rear side stopper is fitted is formed at a rear end portion of the rotary shaft. A rear side stopper has three projecting chips fitted into the fitting groove and three leaf spring chips in contact with an inner ring of a rolling bearing forming a bearing structure. The rear side stopper has a structure in which the rear side stopper generates spring force for restoring an original shape thereof when the rear side stopper is compressed in an axial direction of the rotary shaft. The rear side stopper is disposed in a compressed state between a wall face surrounding the fitting groove and the inner ring of the rolling bearing.

12 Claims, 6 Drawing Sheets

MOUNTING STRUCTURE OF ROTARY SHAFT OF ROTARY ELECTRIC MACHINERY

BACKGROUND OF THE INVENTION

1. Field of the Invention

The present invention relates to a mounting structure of a rotary shaft of rotary electric machinery such as a fan motor.

2. Description of the Related Art

A rotary shaft of rotary electric machinery such as a fan motor is generally supported by a rolling bearing such as a ball bearing having a plurality of rolling elements disposed between an inner ring and an outer ring. With a rear end portion of the rotary shaft, a coming off preventing ring member as a rear side stopper rotating with the rotary shaft is fitted. Such a fan motor having the rear side stopper or the ring member is shown in FIG. 2 in U. S. Pat. No. 5,879,141. When a rotor fixed to the rotary shaft is rotating, the rotary shaft vibrates in an axial direction of the rotary shaft in the inner ring of the rolling bearing. In order to cope with such vibration, a structure in which a coil spring is disposed between the rear side stopper or the ring member and the inner ring of the rolling bearing is employed in the fan motor, for example. There is also proposed a structure in which an annular spring member or the like having a spring property is disposed between a front side stopper and the inner ring of the rolling bearing, the front side stopper being fitted with a front end portion of the rotary shaft for preventing the rotary shaft from moving to a rear side in the axial direction of the rotary shaft further than necessary.

In the conventional structure, the two members, i.e., the ring member and the spring member are used to cope with vibration of the rotary shaft in the axial direction. However, use of the two members not only increases the number of man-hours and/or manufacturing steps necessary to assemble the rotary electric machinery but also increases a price of the rotary electric machinery.

SUMMARY OF THE INVENTION

It is an object of the present invention to provide a mounting structure of a rotary shaft of rotary electric machinery in which it is possible to cope with vibration of a rotary shaft in an axial direction with a low parts count.

It is another object of the invention to provide a fan motor less expensive than a conventional fan motor.

It is yet another object of the invention to provide a fan motor that requires a lower parts count than the conventional fan motor.

The present invention improves the mounting structure of the rotary shaft of the rotary electric machinery such as the fan motor. The rotary shaft is rotatably supported by a bearing structure. The bearing structure includes one or more rolling bearings each having a plurality of rolling elements disposed between an inner ring and an outer ring for rotatably supporting the rotary shaft fitted with or inserted into an inner side of the inner ring. In general, the bearing structure is formed of two rolling bearings. The bearing structure is held by a bearing holder. A front side stopper is mounted to a front end portion of the rotary shaft projecting toward a front side (one side in the axial direction or a direction opposite to a direction in which the rotary shaft is inserted into the bearing structure) in an axial direction of the rotary shaft from the bearing structure. The front side stopper prevents the rotary shaft from moving toward a rear side (the other side in the axial direction or a direction in which the rotary shaft is inserted into the bearing structure) in the axial direction of the rotary shaft further than necessary. The front side stopper may be formed of a portion of a cup member to which a rotor is fixed in a case of the fan motor. A rear side stopper is mounted to a rear end portion of the rotary shaft projecting toward the rear side in the axial direction of the rotary shaft from the bearing structure. The rear side stopper prevents the rotary shaft from moving toward the front side in the axial direction of the rotary shaft further than necessary. A fitting groove into which a portion of the rear side stopper is fitted is formed at the rear end portion of the rotary shaft. The rear side stopper has a fitting portion to be fitted into the fitting groove and a contact portion in contact with the inner ring of the rolling bearing forming the bearing structure and the rear side stopper has a structure in which the rear side stopper generates spring force for restoring an original shape thereof when the rear side stopper is compressed in the axial direction of the rotary shaft (when forces for pinching the structure from opposite sides in the axial direction are applied). The rear side stopper is disposed in a compressed state between the fitting groove (specifically, a wall face surrounding the fitting groove) and the inner ring of the rolling bearing.

Spring force of the rear side stopper acts to suppress vibration in the axial direction of the rotating rotary shaft. In the invention, disposing of the rear side stopper in a predetermined position at the rear end portion of the rotary shaft is all that is needed. Therefore, it is possible to suppress the vibration of the rotary shaft in the axial direction with a low parts count. As a result, the number of man-hours and steps necessary to assemble the rotary electric machinery can be decreased and a price of the rotary electric machinery can be reduced.

The rear side stopper may have any structure if the structure can generate the above spring force. For example, the rear side stopper includes an annular main body fitted with the rear end portion of the rotary shaft, one or more projecting chips formed integrally with an inner peripheral portion of the annular main body and forming the fitting portion fitted with the fitting groove, and a plurality of leaf spring chips formed integrally with the inner peripheral portion of the annular main body, standing toward the front side from the annular main body, and each having at a tip end portion thereof the contact portion. The rear side stopper with such a structure can be produced easily and at low cost by applying machining to a plate made of metal. The rear side stopper may have a structure in which the plurality of projecting chips (preferably, three) are disposed at substantially equal intervals in a peripheral direction of the annular main body, the plurality of leaf spring chips (preferably, three) are disposed at substantially equal intervals in the peripheral direction of the annular main body, and the plurality of projecting chips and the plurality of leaf spring chips are disposed alternately in the peripheral direction. With such a structure, the rear side stopper can be produced by one press working. It is possible to position the rear side stopper in a stable state with respect to the fitting groove at the rear end portion of the rotary shaft and to ensure stable spring force. It is preferable that a cut portion extending in a diameter direction of the rotary shaft and forming a pair of butt portions at a portion of the annular main body is formed at a portion of the main body. If such a cut portion is formed, it is possible to relatively easily fit the plurality of projecting chips of the rear side stopper with the fitting groove of the rotary shaft.

The rear side stopper may be formed of a coil spring. In this case, the fitting groove formed at the rear end portion of the rotary shaft is formed of an annular groove completely surrounding a part of an outer periphery of the rear end portion of the rotary shaft. A portion forming a bottom face of the annular groove of the rotary shaft is formed of a cylindrical column portion positioned on the rear side and a truncated cone portion formed continuously with the cylindrical column portion and positioned forward of the cylindrical column portion. An outline or profile of the coil spring fitted into the fitting groove has a shape of a truncated cone in which a diameter of a portion positioned on an outside of the cylindrical column portion and forming the fitting portion is smaller than a diameter of a portion forming the contact portion in contact with the inner ring. In other words, the coil spring has a shape whose diameter gradually increases from one end (rear side) toward the other end (front side). If the coil spring in such a shape is used, mounting of the coil spring to the rear end portion of the rotary shaft is facilitated and the coil spring can be positioned accurately or securely.

A fan motor to which the invention is applied has the following structure. The fan motor comprises a rotary shaft, a bearing structure including two rolling bearings each having a plurality of rolling elements disposed between an inner ring and an outer ring for rotatably supporting the rotary shaft fitted with or inserted into an inner side of the inner ring, a bearing holder for holding the two rolling bearings, a motor support mounted with the bearing holder, a stator core fixed to the motor support and having a plurality of stator-side magnetic poles, a plurality of exciting windings mounted to the stator core, a cup member having a base wall portion fixed to a front end portion positioned on a front side in an axial direction of the rotary shaft and a cylindrical peripheral wall portion standing toward a rear side in the axial direction of the rotary shaft from an outer peripheral portion of the base wall portion, an impeller including a permanent magnet unit having a plurality of rotor-side magnetic poles made of permanent magnet and fixed to an inner peripheral face of the peripheral wall portion such that the magnetic poles are arranged in a peripheral direction of the peripheral wall portion and a plurality of blades disposed on an outer periphery of the peripheral wall portion of the cup member for exhaling or discharging toward the front side or the rear side, a front side stopper mounted to a front end portion of the rotary shaft projecting toward the front side in the axial direction of the rotary shaft from the bearing structure for preventing the rotary shaft from moving toward the rear side in the axial direction of the rotary shaft further than necessary, and a rear side stopper mounted to a rear end portion of the rotary shaft projecting toward the rear side in the axial direction of the rotary shaft from the bearing structure for preventing the rotary shaft from moving toward the front side further than necessary. A fitting groove into which a portion of the rear side stopper is fitted is formed at the rear end portion of the rotary shaft. The rear side stopper has a fitting portion to be fitted into the fitting groove and a contact portion in contact with the inner ring of the rolling bearing positioned on the rear side and the rear side stopper has a structure in which the rear side stopper generates spring force for restoring an original shape thereof when the rear side stopper is compressed in a direction parallel to the axial direction of the rotary shaft. The rear side stopper is disposed in a compressed state between a wall face surrounding the fitting groove and the inner ring.

DESCRIPTION OF THE PREFERRED EMBODIMENTS

Figure 1:
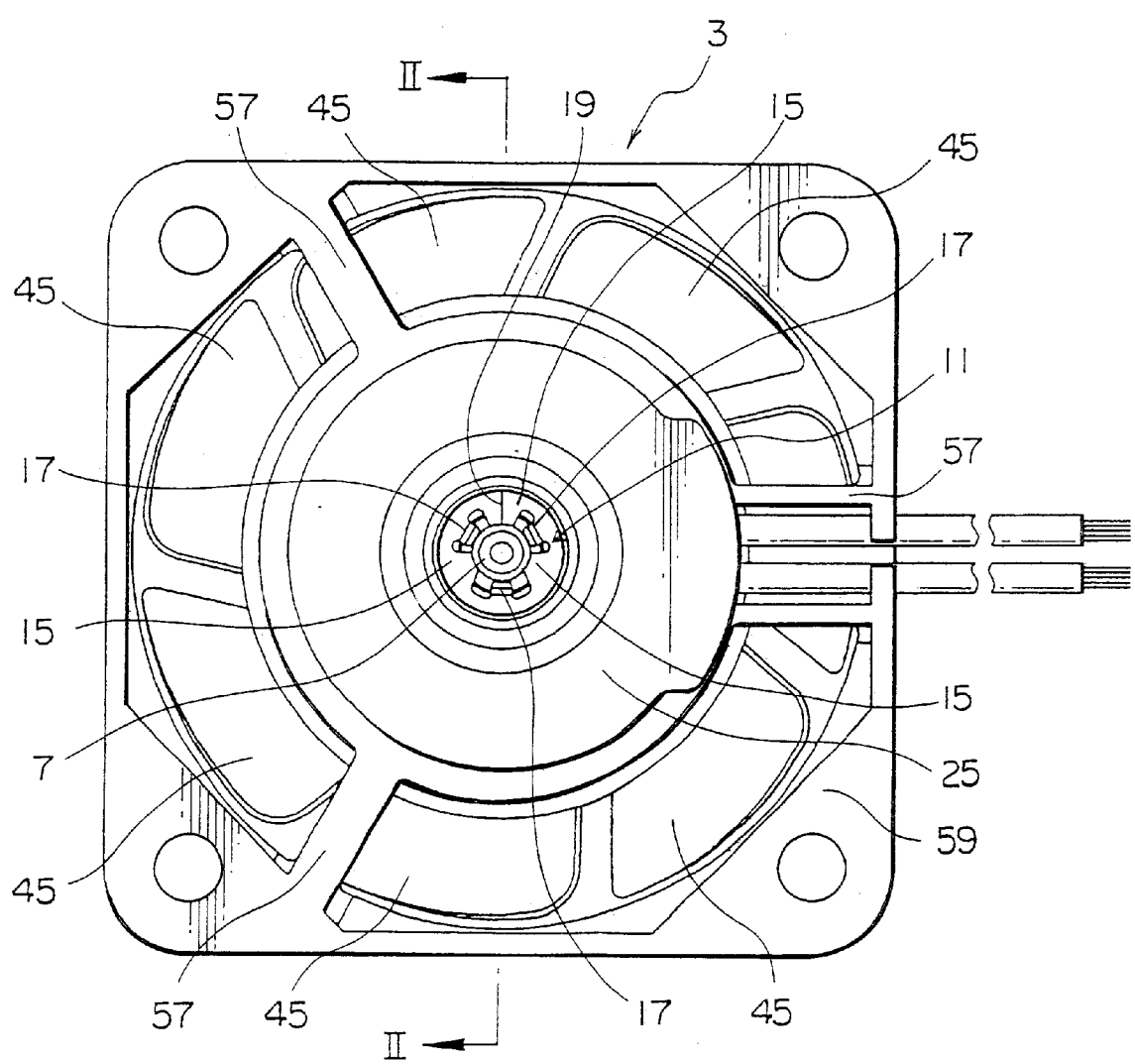
FIG. 1 is a plan view of an example of an embodiment in which the present invention is applied to a fan motor using a permanent-magnet motor as a driving source.
Figure 2:
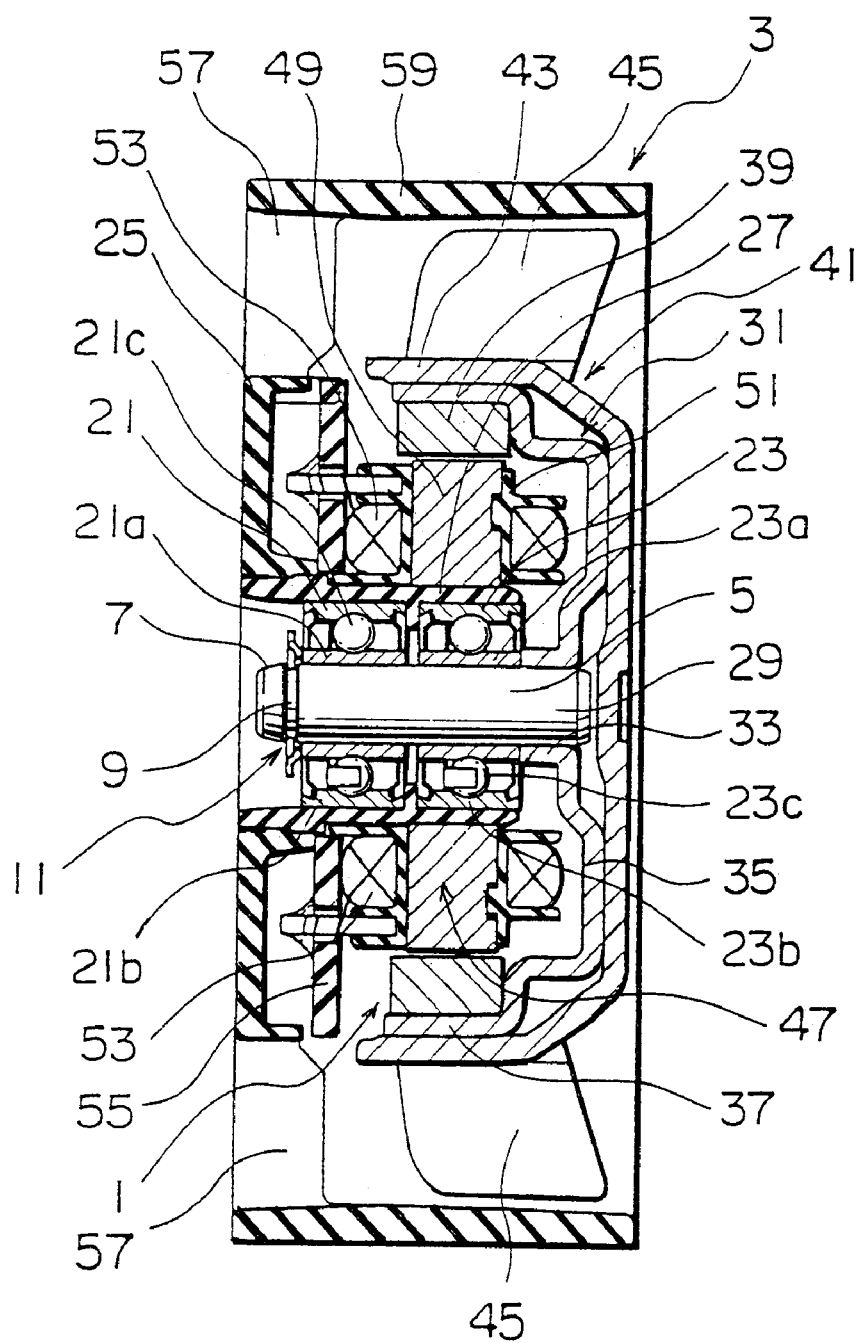
FIG. 2 is a sectional view taken along the line II—II in FIG. 1.
Figure 3:
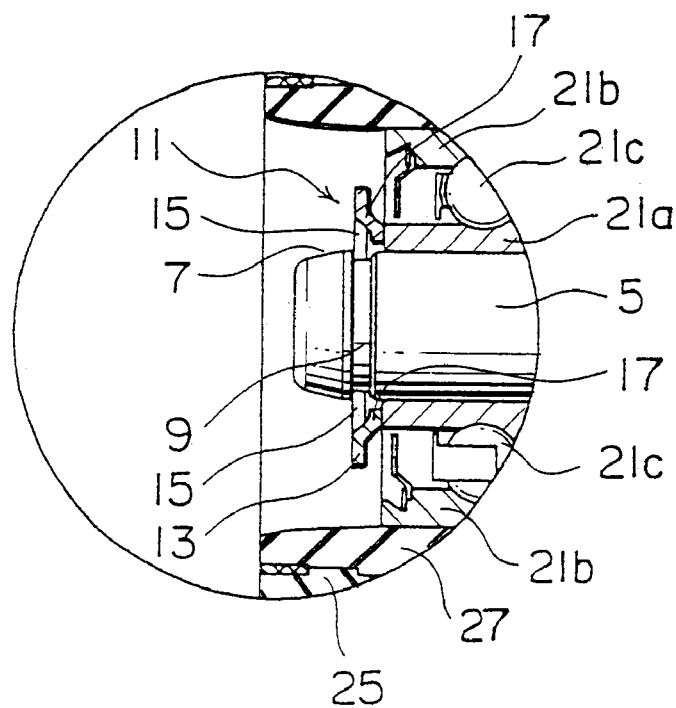
FIG. 3 is an enlarged view of an essential portion of FIG. 2.

An embodiment of the present invention will be described below in detail by reference to the drawing. FIG. 1 is a plan view of an example of an embodiment in which the present invention is applied to a fan motor 3 using a permanent-magnet motor 1 as a driving source. FIG. 2 is a sectional view taken along the line II—II in FIG. 1. FIG. 3 is an enlarged view of an essential portion of FIG. 2. In the following description, a direction in which a rotary shaft 5 is inserted at an assembly stage into a bearing structure portion that will be described later (leftward direction in FIG. 2) will be referred to as a rear side while an opposite direction (rightward direction in FIG. 2) will be referred to as a front side.

Figure 4:
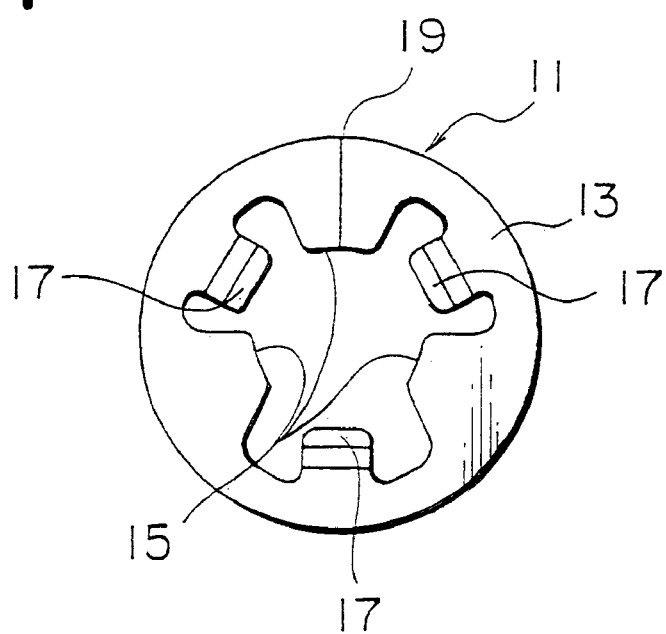
FIG. 4 is a plan view of a rear side stopper used in the embodiment in FIG. 1.

As shown in FIGS. 2 and 3, an annular fitting groove 9 is formed on one end, i.e., a rear end portion 7 of the rotary shaft 5 of the motor 1. A portion of the rear end portion 7 at the rear side of the fitting groove 9 is tapered such that a diameter of the portion reduces toward the rear side. A portion of a rear side stopper 11 as a coming off preventing member is fitted with the fitting groove 9. As shown in FIGS. 3 and 4, the rear side stopper 11 has an annular main body 13 fitted with the rear end portion 7 of the rotary shaft 5, three projecting chips 15 formed integrally with an inner peripheral portion of the annular main body 13 and constituting fitting portions fitted with the fitting groove 9, and three leaf spring chips 17 formed integrally with the inner peripheral portion of the annular main body 13, standing toward the front side from the annular main body 13, and each having at a tip end portion thereof a contact portion. The rear side stopper 11 with such a structure can be produced easily and at low cost by applying press working (machining) to a plate made of metal such as stainless steel, e.g., SUS301, having a spring property. The tree projecting chips 15 are disposed at substantially equal intervals (about 120 degrees) in a circumferential direction of the annular main body 13. The three leaf spring chips 17 are also disposed at substantially equal intervals (about 120 degrees) in the circumferential direction of the annular main body 13. The projecting chips 15 and the leaf spring chips 17 are disposed alternately in the circumferential direction (at intervals of 60 degrees). Each of the three leaf spring chips 17 has a structure in which the leaf spring chip generates spring force for restoring its original shape when the leaf spring 17 is compressed in the axial direction of the rotary shaft 5.

With such a structure, the rear side stopper 11 can be produced by one press working. Moreover, it is possible to position the rear side stopper 11 in a stable state with respect to the fitting groove 9 of the rear end portion 7 of the rotary shaft 5, and in addition, the spring force generated by the leaf spring chip 17 is stabilized. At a portion (where one of the projecting chips 15 is formed) of the annular main body 13, a cut portion (or a slit) 19 extending in a diameter direction of the rotary shaft 5 for forming a pair of butt portions at a portion of the main body 13 (for cutting the one projecting chip 15 into halves in the diameter direction) is formed. If such a cut portion 19 is formed, it is possible to open up the cut portion 19 of the annular main body 13 toward opposite sides. Therefore, it is possible to relatively easily fit the three projecting chips 15 of the rear side stopper 11 with the fitting groove 9 of the rotary shaft 5.

The rotary shaft 5 is rotatably supported by rolling bearings 21 and 23 formed of two ball bearings arranged in the axial direction of the rotary shaft 5. In this example, bearing structure comprises the two rolling bearings 21 and 23. Inner rings 21a and 23a of the rolling bearings 21 and 23 are fitted onto the rotary shaft 5. As shown in FIG. 3, the tip end portions (contact portions) of the three leaf spring chips 17 of the rear side stopper 11 are in contact with a rear end face (end face on a rear side in the axial direction) of the inner ring 21a of the one rolling bearing 21 positioned on the rear side. The outer rings 21b and 23b of the rolling bearings 21 and 23 are fitted and held in a bearing holder 27 that is fitted or press-fitted into a fitting hole formed at a center portion of a motor support 25 made of insulating resin. Reference numerals 21c and 23c designate a plurality of rolling elements disposed between the inner rings 21a and 23a and the outer rings 21b and 23b.

The rear side stopper 11 prevents the rotary shaft 5 from moving toward the front side in the axial direction further than necessary. The rear side stopper 11 is disposed in a compressed state between the fitting groove 9 (specifically, a wall face surrounding the fitting groove) and the inner ring 21a of the rolling bearing 21. As a result, the spring force of the leaf spring chip 17 of the rear side stopper 11 acts to suppress vibration of the rotating rotary shaft 5 in the axial direction. If the rear side stopper 11 with such a structure is used, disposing of the rear side stopper 11 in a predetermined position at the rear end portion 7 of the rotary shaft 5 is all that is needed. Therefore, it is possible to suppress the vibration in the axial direction of the rotary shaft 5 with a low parts count. As a result, the number of man-hours or steps necessary to assemble the fan motor can be decreased and the price of the fan motor can be reduced.

As shown in FIG. 2, to a portion projecting toward the front side from a front end portion 29 of the rotary shaft 5, i.e., the rolling bearing 23, a cup member 31 made of material having magnetic permeability is fixed. The cup member 31 has a base wall portion 35 including a cylindrical boss 33 with and to which the front end portion 29 of the rotary shaft 5 is fitted and fixed at a center portion and a cylindrical peripheral wall portion 37 standing toward the rear side (a left side in FIG. 2 or a side on which the motor support 25 is positioned) in the axial direction of the rotary shaft 5 from an outer peripheral portion of the base wall portion 35. In this example, the boss 33 constitutes a front side stopper. A rear end face of the boss 33 is in contact with the inner ring of the rolling bearing 23 to prevent the rotary shaft 5 from moving toward the rear side in the axial direction (the other direction in the axial direction or a direction in which the rotary shaft 5 is inserted into the rolling bearing 23) further than necessary.

Disposed at an inner peripheral portion of the peripheral wall portion 37 of the cup member 31 is a permanent magnet unit 39 having a plurality of rotor-side magnetic poles made of permanent magnet and fixed to an inner peripheral face of the peripheral wall portion 37 such that the magnetic poles are arranged in a peripheral direction of the peripheral wall portion 37. The plurality of rotor-side magnetic poles may be formed of a plurality of permanent magnets or may have a single annular permanent magnet having north poles and south poles alternately in the peripheral direction. A second cup member 41 is fitted with and fixed to an outer side of the cup member 31. A plurality of blades 45 are fixed to the outer peripheral face of a peripheral wall portion 43 of the second cup member 41 at predetermined intervals in the peripheral direction. Shapes of the plurality of blades 45 are determined such that the blades 45 blow or exhale in the axial direction of the rotary shaft when the rotary shaft 5 rotates. In this example, an impeller is formed of the second cup member 41 and the plurality of blades 45.

A stator core 47 is fitted with and fixed to an outer peripheral portion of the bearing holder 27, thereby fixing the stator core 47 to the motor support 25. The stator core 47 has stator-side magnetic poles 49 formed of a plurality of salient-pole magnetic poles disposed at predetermined intervals in the peripheral direction. Pole faces of the plurality of rotor-side magnetic poles and pole faces of the plurality of stator-side magnetic poles 49 face each other in the diameter direction of the rotary shaft 5.

An insulator 51 made of insulating resin is mounted to the stator core 47 and exciting windings 53 for a plurality of phases are wound around the plurality of stator-side magnetic poles 49 of the stator core 47. A reference numeral 55 designates a circuit board on which a control circuit for controlling exciting current of the exciting windings 53 is included. A cylindrical housing 59 is disposed on an outside in the diameter direction of the motor support 25 through three webs 57 disposed at predetermined intervals in the peripheral direction.

Figure 5:
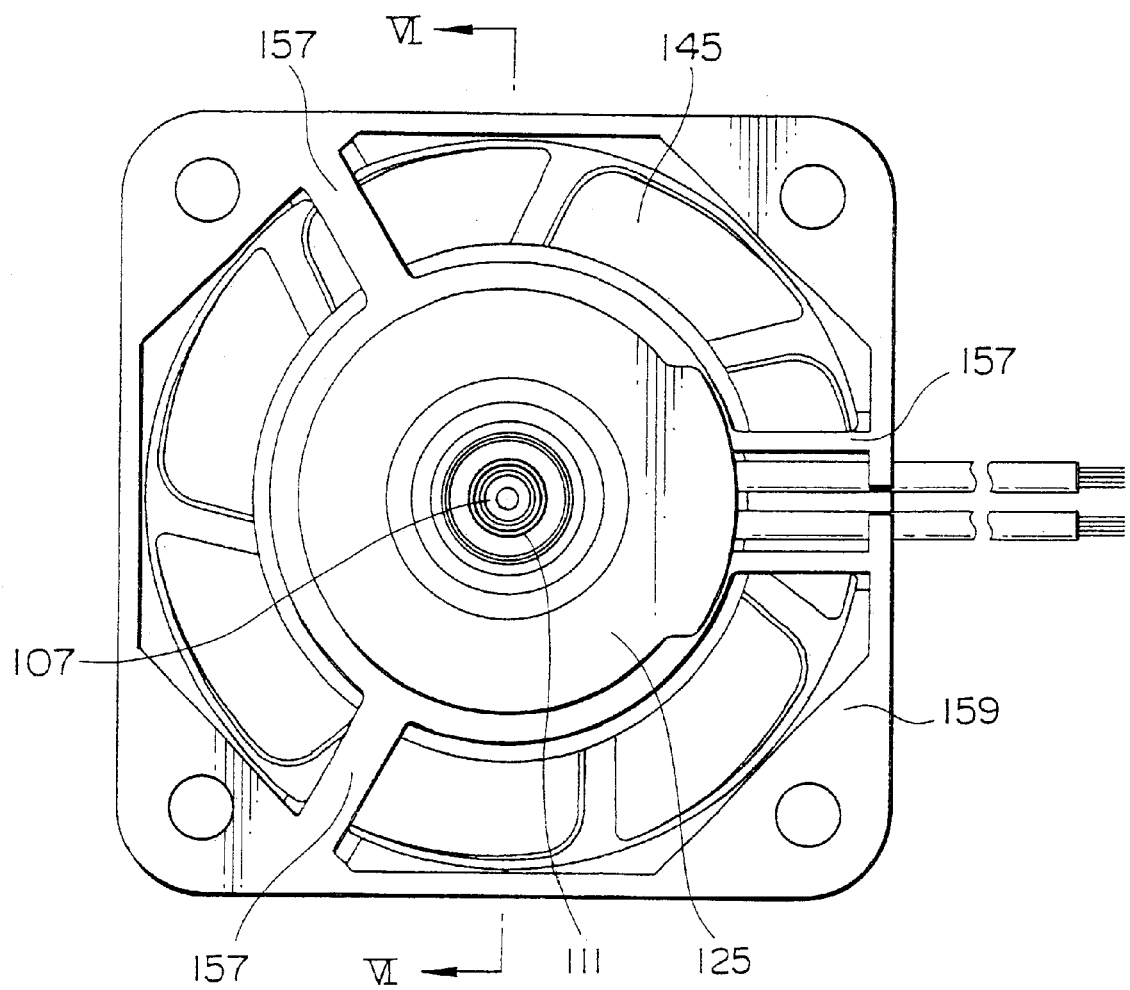
FIG. 5 is a plan view of an example of a second embodiment in which the present invention is applied to a fan motor using a permanent-magnet motor as a driving source.
Figure 6:
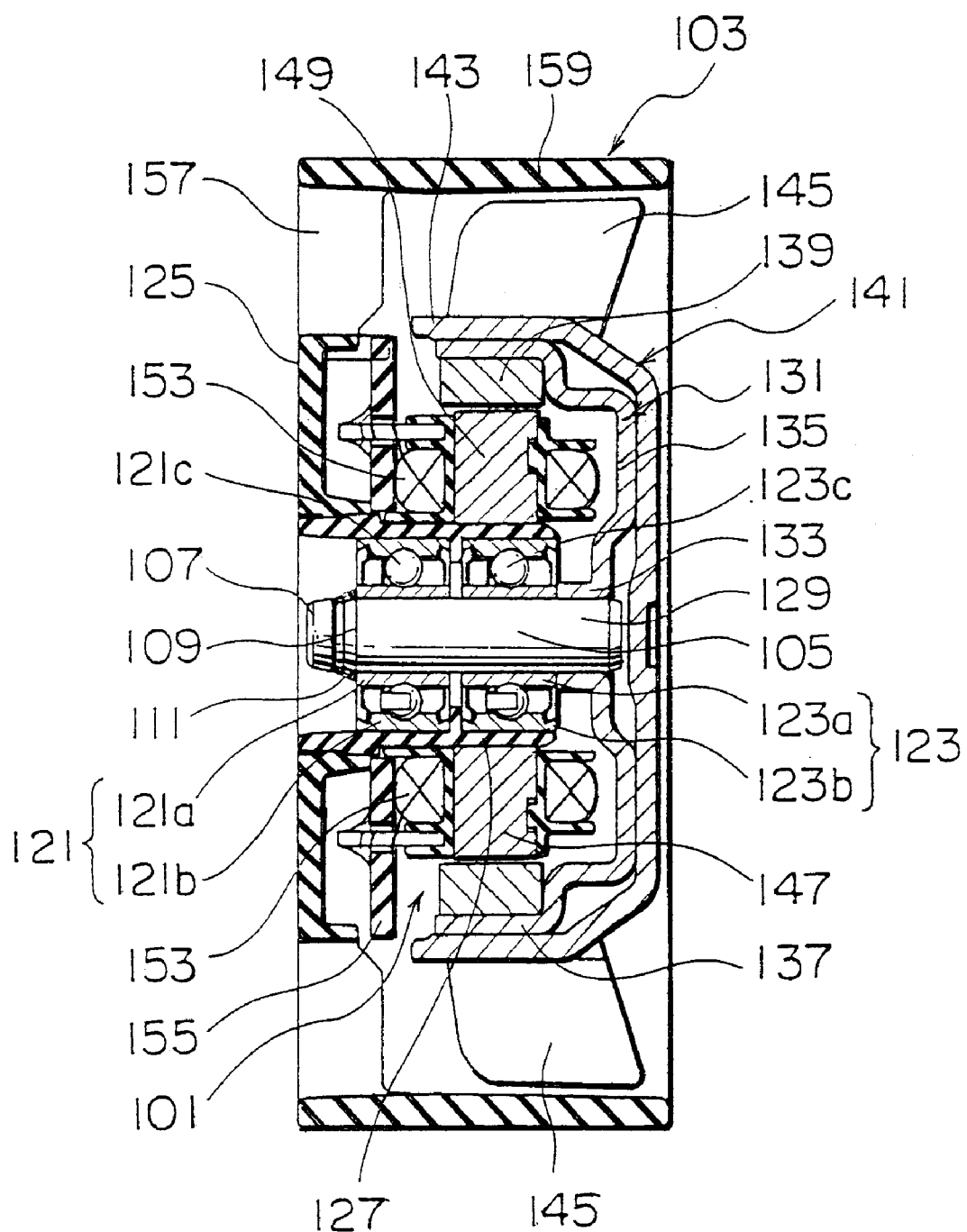
FIG. 6 is a sectional view taken along the line VI—VI in FIG. 5.
Figure 7:
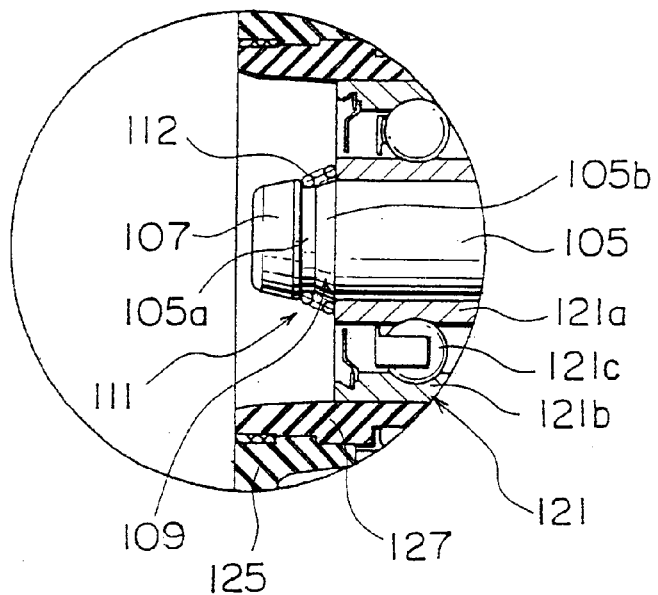
FIG. 7 is an enlarged view of an essential portion of FIG. 6.

FIG. 5 is a plan view of a second embodiment in which the present invention is applied to a fan motor, FIG. 6 is a sectional view taken along the line VI—VI in FIG. 5, and FIG. 7 is an enlarged view of an essential portion of FIG. 6. In FIGS. 5 to 7, constituting portions similar to those in the first embodiment shown in FIGS. 1 to 5 are provided with reference numerals 100 greater than those in FIGS. 1 to 5. The second embodiment is different from the first embodiment in a structure of a rear side stopper 111 and a shape of a fitting groove 109 of a rotary shaft 105. Other structures of the second embodiment are similar to those of the first embodiment.

Figure 8A:
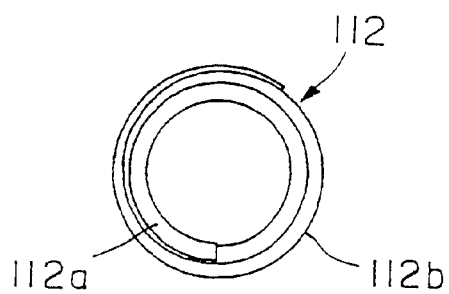
FIGS. 8(A) and 8(B) are a plan view and a front view of a coil spring used as a rear side stopper in the embodiment in FIG. 5.
Figure 8B:
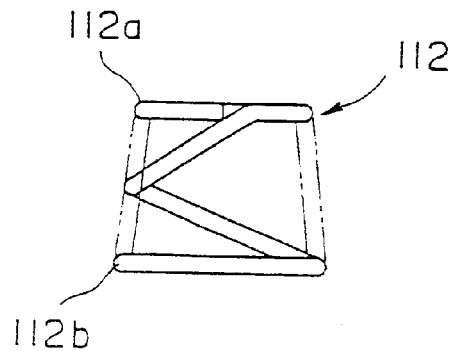

In the second embodiment, a coil spring 112 is used as the rear side stopper 111. The fitting groove 109 formed at a rear end portion 107 of the rotary shaft 105 is formed of an annular groove completely surrounding a part of an outer periphery of the rear end portion 107 of the rotary shaft 105. A portion of the rotary shaft 105 forming a bottom face of the fitting groove 109 is formed of a cylindrical column portion 105a positioned on a rear side and a truncated cone portion 105b formed continuously with the cylindrical column portion 105a and positioned forward of the cylindrical column portion 105a. As shown in FIGS. 7 and 8, the coil spring 112 has a shape of an outline or profile of a truncated cone in which a diameter of a portion (fitting portion) 102a positioned on an outside of the cylindrical column portion 105a formed on the rotary shaft 105 is smaller than a diameter of a portion (contact portion) 102b in contact with an inner ring 121a of a rolling bearing 121. In other words, the coil spring 112 has a shape in which a diameter gradually increases from the one end (rear side) 102a toward the other end (front side) 102b. The coil spring 112 is disposed in a compressed state in the axial direction between an annular inner wall face positioned on a rear side in the axial direction out of wall faces surrounding the fitting groove 109 and a rear end face of the inner ring of the rolling bearing 121. If the coil spring 112 in such a shape is used as the rear side stopper, mounting of the coil spring 112 to the rear end portion 107 of the rotary shaft 105 is facilitated and the coil spring 112 can be positioned accurately or securely.

Although the bearing structure portion is formed of the two rolling bearings in the above two embodiments, it is of course possible to apply the invention to a single-bearing fan motor in which the bearing structure is formed of a single rolling bearing. Although the above embodiments are examples in which the invention is applied to the outer rotor-type fan motor, it is of course possible to apply the invention to an inner rotor-type fan motor in which a rotor rotates in a stator.

According to the invention, by only disposing the rear side stopper in the predetermined position of the rear end portion of the rotary shaft, it is advantageously possible to suppress vibration of the rotary shaft in the axial direction with a low parts count, to reduce the number of man-hours necessary to assemble the rotary electric machinery, and to reduce a price of the rotary electric machinery.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A mounting structure of a rotary shaft of rotary electric machinery comprising:
    a bearing structure including one or more rolling bearings each having a plurality of rolling elements disposed between an inner ring and an outer ring for rotatably supporting said rotary shaft fitted with an inner side of said inner ring;
    a bearing holder for holding said bearing structure;
    a front side stopper mounted to a front end portion of said rotary shaft projecting toward a front side in an axial direction of said rotary shaft from said bearing structure for limiting movement of said rotary shaft toward a rear side in said axial direction of said rotary shaft; and
    a rear side stopper mounted to a rear end portion of said rotary shaft projecting toward said rear side in said axial direction of said rotary shaft from said bearing structure for limiting movement of said rotary shaft toward said front side in said axial direction of said rotary shaft,
    wherein a fitting groove is formed at said rear end portion of said rotary shaft, and a portion of said rear side stopper is fitted into said fitted groove;
    said rear side stopper has a fitting portion to be fitted into said fitting groove and a contact portion in contact with said inner ring of said rolling bearing forming said bearing structure and said rear side stopper has a structure wherein said tear side stopper generates spring force in said structure for restoring an original shape thereof when said rear side stopper is compressed in said axial direction of said rotary shaft, and
    said rear side stopper is disposed in a compressed state between said fitting groove and said inner ring.

2. A mounting structure of a rotary shaft of rotary electric machinery according to claim 1,
    wherein said rear side stopper includes:
    an annular main body fitted with said rear end portion of said rotary shaft;
    one or more projecting chips formed integrally with an inner peripheral portion of said annular main body and forming said fitting portion fitted with said fitting groove; and
    a plurality of leaf spring chips formed integrally with said inner peripheral portion of said annular main body, said leaf spring chips standing toward said front side from said annular main body, and each of said leaf spring chips having at a tip end portion thereof said contact portion.

3. A mounting structure of a rotary shaft of rotary electric machinery according to claim 2,
    wherein said plurality of projecting chips are disposed at substantially equal intervals in a peripheral direction of said annular main body;
    said plurality of leaf spring chips are disposed at substantially equal intervals in said peripheral direction of said annular main body; and
    said plurality of projecting chips and said plurality of leaf spring chips are disposed alternately in said peripheral direction.

4. A mounting structure of a rotary shaft of rotary electric machinery according to claim 2, wherein a cut portion is formed a t a portion of said main body, said cut portion extending in a diameter direction of said rotary shaft and forming a pair of butt portions at said portion of said main body.

5. A mounting structure of a rotary shaft of rotary electric machinery according to claim 1, wherein said rear side stopper is formed of a coil spring.

6. A mounting structure of a rotary shaft of rotary electric machinery according to claim 5,
    wherein said fitting groove, formed at said rear end portion of said rotary shaft, is formed of an annular groove completely surrounding a part of an outer periphery of said rear end portion of said rotary shaft;
    a portion is formed of a cylindrical column portion and a truncated cone portion, said cylindrical column portion being positioned on said rear side and said truncated cone portion being formed continuously with said cylindrical column portion and positioned on said front side, and wherein said bottom portion of said cylindrical column portion forms a bottom face of said annular groove of said rotary shaft; and
    an outline of said coil spring fitted into said fitting groove has a shape of a truncated cone in which-a diameter of a portion positioned on an outside of said cylindrical column portion and forming said fitting portion is smaller than a diameter of a portion forming said contact portion in contact with said inner ring.

7. A fan motor comprising:
    a rotary shaft;
    a bearing structure including two rolling bearings each having a plurality of rolling elements disposed between an inner ring and an outer ring for rotatably supporting said rotary shaft fitted with an inner side of said inner ring;
    a bearing holder for holding said two rolling bearings;
    a motor support mounted with said bearing holder;
    a stator core fixed to said motor support and having a plurality of stator-side magnetic poles;

a plurality of exciting windings mounted to said stator core;

a cup member having a base wall portion fixed to a front end portion positioned on a front side in an axial direction of said rotary shaft and a cylindrical peripheral wall portion standing toward a rear side in said axial direction of said rotary shaft from an outer peripheral portion of said base wall portion;

an impeller including a permanent magnet unit having a plurality of rotor-side magnetic poles made of permanent magnet and fixed to an inner peripheral face of said peripheral wall portion such that said magnetic poles are arranged in a peripheral direction of said peripheral wall portion and a plurality of blades disposed on an outer periphery of said peripheral wall portion of said cup member for exhaling toward said front side or said rear side;

a front side stopper mounted to a front end portion of said rotary shaft projecting toward said front side in said axial direction of said rotary shaft from said bearing structure portion for limiting movement of said rotary shaft toward said rear side in said axial direction of said rotary shaft, and a rear side stopper mounted to a rear end portion of said rotary shaft projecting toward said rear side in said axial direction of said rotary shaft from said bearing structure portion for limiting movement of said rotary shaft toward said front side, wherein a fitting groove is formed at said rear end portion of said rotary shaft, and a portion of said rear side stopper is fitted into said fitting grove, said rear side stopper has a fitting portion to be fitted into said fitting groove and a contact portion in contact with said inner ring of said rolling bearing positioned on said rear side and said rear side stopper has a structure wherein said rear side stopper generates spring force in said structure for restoring an original shape thereof when said rear side stopper is compressed in a direction parallel to said axial direction of said rotary shaft, and said rear side stopper is disposed in a compressed state between a wall face surrounding said fitting groove and said inner ring.

8. A fan motor according to claim 7, wherein said rear side stopper includes:

an annular main body fitted with said rear end portion of said rotary shaft;

a plurality of projecting chips formed integrally with an inner peripheral portion of said annular main body and forming said fitting portion fitted with said fitting groove; and a plurality of leaf spring chips formed integrally with said inner peripheral portion of said annular main body, said leaf spring chips standing toward said front side from said annular main body, and each of said leaf spring chips having at a tip end portion thereof said contact portion.

9. A fan motor according to claim 8, wherein said three projecting chips are disposed at substantially equal intervals in a peripheral direction of said annular main body;

said three leaf spring chips are disposed at substantially equal intervals in said peripheral direction of said annular main body; and said three projecting chips and said three leaf spring chips are disposed alternately in said peripheral direction.

10. A fan motor according to claim 7, wherein a cut portion is formed at a portion of said main body, said cut portion extending in a diameter direction of said rotary shaft and forming a pair of butt portions at said portion of said main body.

11. A fan motor according to claim 7, wherein said rear side stopper is formed of a coil spring.

12. A fan motor according to claim 11, wherein said fitting groove formed at said rear end portion of said rotary shaft is formed of an annular groove completely surrounding a part of an outer periphery of said rear end portion of said rotary shaft;

a portion is formed of a cylindrical column portion and a truncated cone portion, said cylindrical column portion being positioned on said rear side and said truncated cone portion being formed seamlessly with said cylindrical column portion and positioned on said front side, and wherein said portion of said cylindrical column portion forms a bottom face of said annular groove of said rotary shaft; and an outline of said coil spring fitted into said fitting groove has a shape in which a diameter gradually increases from a portion positioned on an outside of said cylindrical column portion and forming said fitting portion toward a portion forming said contact portion in contact with said inner ring.

* * * * *

UNITED STATES PATENT AND TRADEMARK OFFICE
CERTIFICATE OF CORRECTION

PATENT NO. : 6,353,274 B1
DATED : March 5, 2002
INVENTOR(S) : Ogawara et al.

It is certified that error appears in the above-identified patent and that said Letters Patent is hereby corrected as shown below:

Column 7,
Line 60, "tear" and insert -- rear -.

Column 8,
Line 29, delete "a t a" and insert -- at a --.
Line 51, delete "which-a" and insert -- which a --.

Signed and Sealed this

Twenty-first Day of May, 2002

Attest:

Attesting Officer

JAMES E. ROGAN
Director of the United States Patent and Trademark Office